United States Patent [19]

Addison

[11] 4,423,888

[45] Jan. 3, 1984

[54] STORE CART WITH CLIPBOARD ITEM-RETENTION MEANS

[76] Inventor: William D. Addison, R.R. 3, Box 129, Greenfield, Ind. 46140

[21] Appl. No.: 350,645

[22] Filed: Feb. 22, 1982

[51] Int. Cl.³ .................. B42D 17/00; G09F 19/00
[52] U.S. Cl. ........................................ 281/45; 40/308
[58] Field of Search .................. 40/19, 316, 308; 281/15 B, 45

[56] References Cited

U.S. PATENT DOCUMENTS

| | | | |
|---|---|---|---|
| 2,864,189 | 12/1958 | Campbell | 40/308 |
| 2,888,761 | 6/1959 | Miller | 40/308 |
| 3,539,204 | 11/1970 | Keller | 40/308 X |
| 3,881,267 | 5/1975 | Hicks | 40/308 |
| 4,034,539 | 7/1977 | Economy | 281/45 X |
| 4,356,651 | 11/1982 | Barlow | 40/308 |

Primary Examiner—E. R. Kazenske
Assistant Examiner—John S. Brown
Attorney, Agent, or Firm—Robert A. Spray

[57] ABSTRACT

A store cart having a clipboard fixed thereto for retaining items such as discount coupons or shopping lists used in the store; and the support of the clipboard is by a loose but positive connection to the cart handle. The clipboard is swingable on the handle between a hanging-down position, and a generally horizontal position for presentation of all the store items to the cart user. The clipboard's length permits it to be also supported by a fixed frame portion of the cart basket, and independent of any foldable partition of the basket; and in each of its positions not interfering with the nesting characteristic of stored carts awaiting use.

1 Claim, 3 Drawing Figures

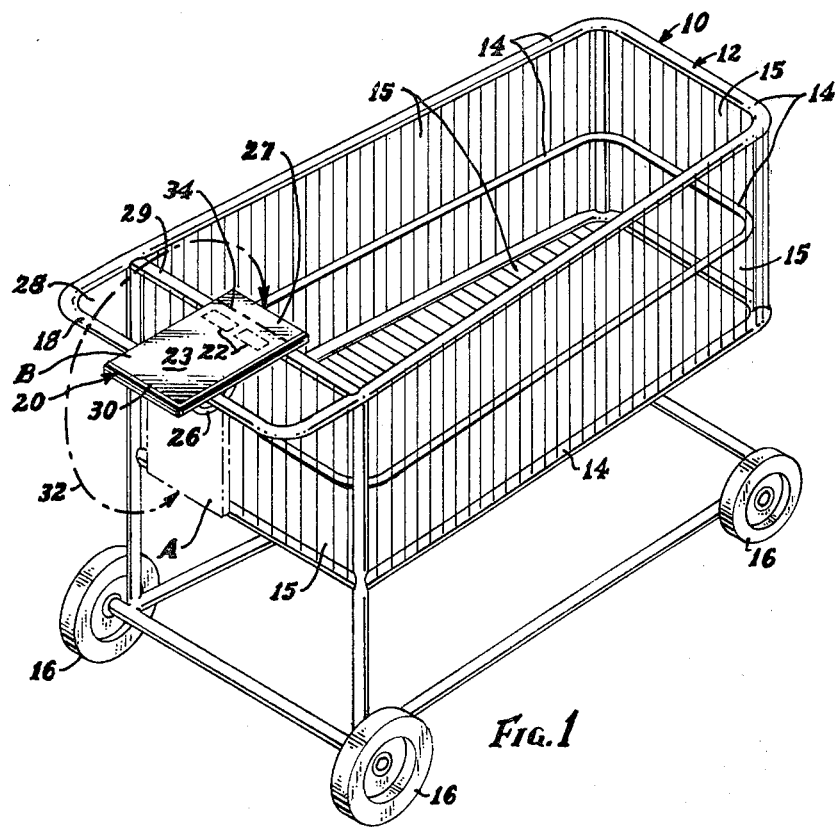
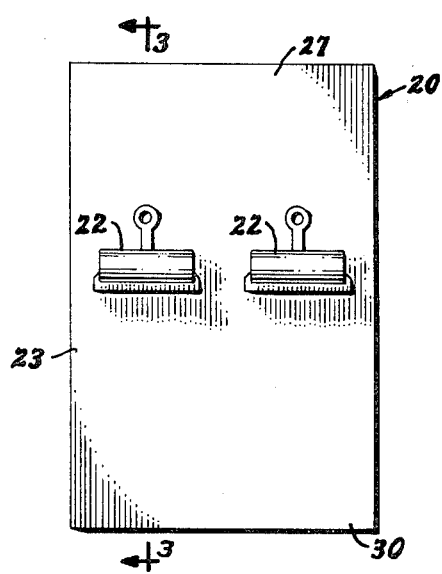
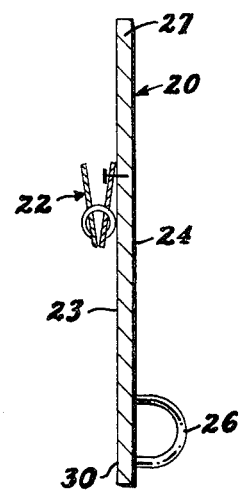

STORE CART WITH CLIPBOARD ITEM-RETENTION MEANS

The present invention relates to movable pushcarts, and more particularly to carts such as are used in grocery stores, markets, some department stores, and similar places, principally by shoppers in "self-service" stores.

Such businesses have long had certain small items which are used in the store by its patrons, such as discount coupons, sale ads, other advertisement sheets or clippings, etc.; and the store patron himself or herself will often bring other items which the patron has prepared, such as grocery lists, shopping lists, gift lists, price-comparison lists, etc.

It is considered beneficial by the patron to use such items, and to the store's benefit to encourage the use of all these various items, as a means of encouraging sales, avoiding a forgetting of a desire for a particular purchase, etc. After all, if the shopper forgets to make a certain purchase on an occasion of a visit to a particular store, the sale and its profit will often be wholly lost to the store; for the patron will not necessarily return to that store just for a forgotten item or items to be purchased. And discount coupons or similar items are considered by stores, perhaps particularly retail stores, to be good incentive tools in the marketing field, particularly if actually used, in addition to their value in giving a purpose for the particular store visit itself.

But prior to the present invention, all those items, which often become quite numerous, have been inconvenient for carrying, except perhaps in a shirt pocket, or a lady's purse, or perhaps just thrown in the bottom of the cart basket.

None of such carrying procedures are fully effective, however, because in such procedure of carrying, the items (coupons, etc.) are too inconspicuous for most convenient use while the store patron is pushing the cart about the store, and the items require a lot of handling if certain products are not overlooked, etc.

And especially is it seen that such carrying procedures are inconvenient and bothersome when it is realized, e.g., that a store patron will likely look at a shopping list or gift list several times, and also when, e.g., it is realized that the patron will look at the several discount coupons repeatedly throughout the stroll through the store, so as to not overlook a desired purchase.

Many store patrons have a strong desire to utilize discount coupons, not only to save money on a particular purchase but almost as a challenge to their sense of thrift by achieving a savings of even merely a few cents per purchase; and thus a patron who uses discount coupons will likely have several of them to use on each occasion of a shopping trip.

The problem of inconvenience and bother to the store patron is further complicated by the fact that many stores' check-out stations have lines of shoppers; and thus it is particularly a time-saving to the patron if he or she has obtained every single product desired to be purchased, before getting into the line of patrons at a check-out counter or station.

These problems of inconvenience and bother in the use of these various store items have particularly existed for the many years since many stores have gone to the "self-service" shopping procedure, which in effect leaves the entire task of seeking out the purchases to the store patron, requiring him or her to walk throughout the store for the selection of purchases without the task being done by a store attendant.

Accordingly, advantageously overcoming the inconveniences and ineffectiveness as indicated above as to other carrying procedures, the present inventive concepts provide a very convenient and useful means of carrying the store coupons, shopping lists, and other store items, while the store patron is strolling about the store in making his or her selections of purchases; and more particularly, the concepts provide a means for carrying those store items in a manner by which they are quite easily seen and used.

The concepts further provide advantageous and convenient carrying means for the coupons and other store items which are optionally usable by a patron utilizing such store items, yet which will be wholly non-bothersome to patrons who do not utilize them.

Further, the inventive concepts provide an incentive for the desired use of such items as discount coupons and shopping lists.

Still further, the concepts provide an advantageous and effectively cart-integral carrying means for coupons, and other store items, which is independent of and non-interfering with foldable partitions conventionally provided on many shopping carts, and which also is generally non-interfering with the characteristics of "cart-nesting" which is provided in many styles of such carts for minimizing the space-requirements for carts awaiting use.

The concepts, more particularly, provide an extra function of the store carts, without bothering the conventional usages of the carts, by providing the carrying means as an integral component of the cart; and this achieves the extra advantages of the carrying means being automatically present and available for every shopper who uses a cart, automatically limiting the retention or carrying means to only one per cart, and avoiding the intentional or unintentional taking or stealing of any of the carrying means.

In carrying out the invention in a preferred embodiment, each store cart is provided with a clipboard which is rotatably carried by the cart handle; and when not in use, the clipboard merely hangs freely, in an out-of-the way condition. However, for its desired use of retaining coupons and other store items, it is swingable rearwardly, upwardly, and over the handle to a position in which it extends across the gap between the cart and the handle, and is stably supported by the rear portion of the fixed basket framing. In either position, it does not interfere with conventional uses of the cart, and it is independent of any position of any foldable partition of the cart, and usable independently of any position in which such foldable partition is placed.

After the invention was made, a search of the U.S. Patent Office was made with the hindsight of this invention; and the results of that search help to indicate the inventive nature of the present concepts.

That is, even though store carts have been known to be used by millions of persons for many years, and even though clipboards have been similarly known and used for many years, and even though store items such as discount coupons and shopping lists have been known and used by millions of persons for many years, and even though many thousands of stores of several types have had "self-service" purchase-selection procedures for many years, only a single reference was cited as embodying any sort of an accessory in combination with the cart.

However, that reference (Day, U.S. Pat. No. 3,993,319, issued on Nov. 23, 1976) is significantly different from the present concepts, both in structure, function, and concepts, as now shown.

More particularly, the Day patent is specifically and expressly merely for a function of providing a convenient check-writing surface, and it does not have or suggest any item-retention means whatever, of any nature, a particularly-significant omission from a conceptual standpoint since Day has a place for mounting clips if it were obvious; the Day device does not have or suggest any support by the cart-handle and fixed portion of the basket frame; it does not have or suggest a stable support wholly independent of any foldable cart-partition or the position thereof, and instead, requires that there be such a partition and requires that it be in open position; its movability is quite opposite that of the present invention; it does not have or suggest any concept of a clipboard having an integral portion which extends across the gap between the cart-handle and the basket's fixed framing; it does not move wholly outside the basket, but, instead, moves interiorly of the basket region; it does not provide for a double function of various components such as the cart-handle, and of the spacing between the handle and the basket framing, and of the size of the clipboard as integrally providing a portion extending over the spacing between the handle and the fixed basket-framing; and, in summary, the Day device could not be utilized in the manner of the present invention without substantial changes which are wholly unsuggested by it.

Moreover, its relatively late date, long after the widespread use of store carts and "self-service" shopping procedures began, emphasizes the lack of inventive creativity of cart-users and cart-manufacturers as to these concepts, expressly illustrated by that Day patent in this very same field, even though there have existed for many years the above-mentioned factors of widespread cart usage and also the need for a convenient check-writing surface which that prior art Day patent provides for his specific purpose, a purpose different from that of the present concepts.

Still further, that Day patent expressly illustrates, by actual precedent, the recognition of patentability by the U.S. Patent Office of the concepts of an integral, cart-supported combination of a store-cart with such a structurally-simple thing as merely a plain writing surface; for as the patent system realistically recognizes, the simplicity of a structure does not be-little the inventive concepts behind the operative construction, and, in contrast, the simplicity of economy of a device, particularly with a double-function achievement of components, is a positive factor of patentability and of a recognition by a patent award that such concepts are of an inventive nature.

The above description is of somewhat introductory and generalized form. More particular details, concepts, and features are set forth in the following and more detailed description of an illustrative embodiment, taken in conjunction with the accompanying drawings, which are of somewhat schematic and diagrammatic nature, and in which:

FIG. 1 is a pictorial view of a combination of a store cart and a clipboard, according to the inventive concepts, the clips being shown in this Figure only schematically, and showing the clipboard in full lines in its horizontal item-presenting position and in chain lines in an out-of-the way position;

FIG. 2 is a face-on view of the clipboard component, illustrating an embodiment with two spring clips as optionally-usable retention means; and FIG. 3 is a cross-sectional view of the clipboard shown in FIG. 2, shown generally as taken by Section-line 3—3 of FIG. 2, this view being shown by principles of orthographic projection from FIG. 2, and thus appearing on the page of drawings as inverted from its vertical or hanging down unused position indicated by the chain-line presentation in FIG. 1.

As shown in the drawings, the concepts of the invention are shown in conjunction with a grocery store shopping cart 10 having a basket or parcel receptacle 12.

The basket 12 is shown as of a conventional form, having a frame 14 of stiff rods or tubes, and generally rectangular in shape. It may be provided with panels or other surfaces such as those indicated at 15, for its sides, ends, and bottom; and it is supported by four wheels 16 for the user's task in pushing the cart 10 throughout the store as the patron selects various purchases.

The cart 10 is of conventional form having a handle means 18 which extends transversely of the basket or receptacle 12 and at a distance to the rear thereof, the handle 18 providing a manually-operable means for pushing and maneuvering the cart 10 in the user's stroll through the store, in the selection of purchases and in taking them to the checkout lane and checkout station.

For such a cart 10, there is provided an item-retention means or clipboard 20, having one or more clips 22 or other retention means carried on the "front" face 23 of the clipboard 20 for releasably retaining whatever are desired by the user for use in the store, i.e., items which are associated with the patrons shopping trip to the store. Such store-associated items typically would be such as discount coupons, shopping lists, advertisements, newspaper clippings, etc. (As separate components as herein described as the components 10 through 22, all parts may be quite conventional.)

However, as a basic concept of the invention, the clipboard 20 or retention means is shown as mounted in an effectively integral manner on the cart 10; and it with its clips 22 provide a very convenient and advantageous means to carry those store-associated items along with the cart 10 while the cart is being used in the store; and the clipboard 20 is both conveniently accessible and visible to the user as he or she moves with the cart about the store.

It is to be noted, in the desired form shown in FIG. 1, and as detailed below, that the carry, the position, and the manipulation of the clipboard 20 is such that it is fully independent of whether any foldable partition is present, and of what is the position of any such foldable partition.

Providing a desired mounting means, the clipboard 20 is shown provided on its rear side 24 with a loop means 26 by which the clipboard 20 is connected to the cart 10; and to prevent theft or other disadvantages of removability, the loops 26 are purposefully firmly and non-releasably connected to the clipboard 20.

Retaining the clipboard 20 on the cart 12, the loop means 26 loosely embraces the cart handle 18; and the clipboard 20 is thus both movably supported and movably interconnected to the cart 10.

The clipboard 20 is movable on the cart 10 between a relatively lower out-of-the-way hang-down position, as shown as position "A," and in which it hangs freely from the cart handle 18, and a relatively higher and more-visible and item-presenting position, generally horizontal as shown as position "B," in which the clips 22 on clipboard face 23 will be accessible to the user.

The clipboard 20 is such that when supported on the handle 18, as shown in FIG. 1, it extends in its horizontal condition "B" such that its forward end 27 extends completely across the gap or spacing 28 by which the cart handle 18 is spaced rearwardly of the basket 12.

This provides that in the relatively higher position "B" the clipboard 20 is supported by two relatively spaced portions of the cart 10; and this provides stable support of the clipboard 20 even though it is connected to the cart 10 at only one of such portions.

The portion of the cart 10 which supports the clipboard 20 even though there is no interconnection of the clipboard and cart at that place is the rearward transverse upper frame member 29 of the basket 12; and on it rests the clipboard extension 27, while the clipboard 20 is in position "B."

It will be noted that the connector loop means 26 is located adjacent the portion 30 of the clipboard 20 which is its top when in the relatively lower position "A" and which is its rearward portion when in its relatively higher or horizontal position "B."

The movement-indicating arrow 32 shows that the support of the clipboard 20 is such that in moving from its relatively lower position "A" to its relatively higher position "B" it is swingable rearwardly, upwardly, then forwardly, about 270°.

With further reference to support of the clipboard 20, it is to be noted that it is supported at spaced portions of the cart 10 in such a manner that although it is stably supported by the cart 10 it is nevertheless connected thereto at only one such portion, thereby enabling the clipboard 20 to move between its horizontal or operative position "B" in which it presents the items in a manner visible to the cart's user, and a retracted or withdrawn position "A."

However, neither position "A" or "B" nor the movement of the clipboard 20 between such positions, require any disconnection of the clipboard 20 from the cart 10 at the cart-portion at which they are interconnected.

This is advantageously provided as shown by the portion of the cart 10 to which the clipboard 20 is connected being the cart handle 18, and the portion of the cart 10 which also supports the clipboard 20 but to which the clipboard is not connected, is a fixedly-located portion of the receptacle, i.e., here the rearward transverse upper frame member 29, both supports being independent of any foldable partition of the cart 10 and of any position of such partition.

The free swinging of the clipboard 20 in its hangdown position "A" is advantageous in carts which "nest" in storage, for it may be easily pushed out of the way in the procedure of the nesting, and it is also advantageous in carts which are pulled over any portion of the checkout station.

The loose connection of loops 26 on handle 18 provides additional movability for the clipboard 20 as may be desired, laterally along handle 18.

For carts 10 provided with a foldable inner partition (not shown) conventionally of a type in which it folds back against the rear one of the cart walls, the clipboard extension 27 is desirably made of a length to generally come to only the length shown in FIG. 1 by the chain line 34, assuring that the extension 27 will not interfere with the movement or rearwardly-folded position of the partition in case it extends above the rear frame-tube or bar 29.

It is thus seen that a combination device, providing in effect a combination store cart and clipboard for store items, according to the inventive concepts, provides a desired and advantageous device, yielding the advantages of a convenient and useful carrying of store items such as discount coupons, shopping lists, etc., and thus avoiding the inconvenience and bother and sometimes item-forgetting methods of carrying such items while pushing a cart in the procedure of "self-service" shopping.

Accordingly, it will thus be seen from the foregoing description of the invention according to this illustrative embodiment, considered with the accompanying drawings, that the present invention provides new and useful concepts of a novel and advantageous combination of an effectively integral shopping cart and a clipboard for retaining store items associated with shopping, and with the advantages of convenience, handiness, and utility from various standpoints such as pointed out herein, yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

What is claimed is:

1. For a store cart having a parcel receptacle which is supported by wheels accommodating movement of the receptacle throughout the store, and having a handle means extending transversely of the receptacle, and at a distance rearwardly of the receptacle, which provide manually-operable means by which the user may maneuver the receptacle in the store, and having a clipboard having retention means thereon for releasably retaining items desired for use in the store, the said clipboard being mounted on the store cart so as to carry the said items along with the receptacle and both conveniently accessible and visible to the user as the user moves with the receptacle about the store, the improvement of the clipboard being mounted upon the handle means of the cart, and the clipboard is movably supported and movably interconnected to the cart thereby, and is movable between a first relatively lower and out-of-the-way position in which it hangs outwardly of the cart from the said handle means of the cart, and a second relatively higher and more-visible and item-presenting position, and in which in the second relatively higher position the clipboard is supported by two relatively spaced portions of the cart providing stable support of the clipboard, even though it is connected to the cart at only one of such portions, the portion of the cart which supports the clipboard even though there is no interconnection of the clipboard and cart at such place being the rearward transverse upper frame member of the parcel receptacle, the support of the clipboard in both its said first and second positions being independent of any movable inner wall means of the cart, and the support of the clipboard being such that in moving from its first relatively lower position to its second relatively higher position it is swingable rearwardly, upwardly, then forwardly, about 270°, and regardless of the position of any movable inner wall means of the cart or even whether the cart is provided with a movable inner wall means.

* * * * *